(12) United States Patent
Migliaro, Jr.

(10) Patent No.: US 8,365,515 B2
(45) Date of Patent: Feb. 5, 2013

(54) GAS TURBINE ENGINE WITH FAN VARIABLE AREA NOZZLE, NACELLE ASSEMBLY AND METHOD OF VARYING AREA OF A FAN NOZZLE

(75) Inventor: Edward F. Migliaro, Jr., Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 978 days.

(21) Appl. No.: 12/374,504

(22) PCT Filed: Oct. 12, 2006

(86) PCT No.: PCT/US2006/039796
§ 371 (c)(1),
(2), (4) Date: Jan. 21, 2009

(87) PCT Pub. No.: WO2008/045050
PCT Pub. Date: Apr. 17, 2008

(65) Prior Publication Data
US 2010/0139243 A1    Jun. 10, 2010

(51) Int. Cl.
*F02K 3/02* (2006.01)
(52) U.S. Cl. .............. 60/226.3; 60/226.1; 60/771
(58) Field of Classification Search ............. 60/226.1, 60/226.2, 226.3, 771
See application file for complete search history.

(56) References Cited

U.S. PATENT DOCUMENTS

| | | | |
|---|---|---|---|
| 3,057,150 A | 10/1962 | Horgan | |
| 3,241,771 A | 3/1966 | Erwin | |
| 3,346,193 A | 10/1967 | Tumicki | |
| 3,439,504 A | 4/1969 | Logerot et al. | |
| 3,543,877 A | 12/1970 | Ranvier et al. | |
| 3,739,582 A | 6/1973 | Maison | |
| 4,052,007 A | 10/1977 | Willard | |
| 4,251,987 A * | 2/1981 | Adamson | 60/805 |
| 5,081,835 A | 1/1992 | Ewing, Jr. | |
| 5,102,049 A | 4/1992 | Ward | |
| 5,769,317 A | 6/1998 | Sokhey et al. | |
| 5,819,528 A * | 10/1998 | Masson | 60/226.2 |
| 6,105,901 A | 8/2000 | Ulanoski et al. | |
| 7,093,793 B2 * | 8/2006 | Lair | 244/53 R |

FOREIGN PATENT DOCUMENTS

EP    0292422    11/1988
(Continued)

OTHER PUBLICATIONS

Machine design Magazine article dated Nov. 5, 1998: "Gas Power Cycle-Jet Propulsion Technology, A Case Study".*
Machine design.com article dated Nov. 5, 1998: "Gears Put a New Spin on Turbofan Performance".*

(Continued)

*Primary Examiner* — Ehud Gartenberg
*Assistant Examiner* — Vikansha Dwivedi
(74) *Attorney, Agent, or Firm* — Carlson, Gaskey & Olds PC

(57) ABSTRACT

A turbofan engine includes a fan variable area nozzle, which includes a louver system having a multiple of slats generally transverse to the engine axis. Each of the louver slats are pivotally mounted to the fan nacelle to vary the effective area of the fan nozzle exit area and permit efficient engine operation at predefined pressure ratios.

18 Claims, 2 Drawing Sheets

FOREIGN PATENT DOCUMENTS

| | | |
|---|---|---|
| EP | 0809011 | 11/1997 |
| FR | 2126922 | 10/1972 |
| FR | 2695960 | 3/1994 |
| GB | 1383651 | 2/1974 |
| WO | WO 00/50759 | 8/2000 |
| WO | WO2005028303 A | 3/2005 |

OTHER PUBLICATIONS

Mechanics and Thermodynamics of Propulsion written by Philip G. Hill and Carl R. Peterson, third printing, Nov. 1970 (pp. 307-308).*
Search Report and Written Opinion mailed on May 24, 2007 for PCT/US2006/039796.

* cited by examiner

GAS TURBINE ENGINE WITH FAN VARIABLE AREA NOZZLE, NACELLE ASSEMBLY AND METHOD OF VARYING AREA OF A FAN NOZZLE

BACKGROUND OF THE INVENTION

The present invention relates to a gas turbine engine, and more particularly to a turbofan engine having a louvered fan variable area nozzle in communication with a fan bypass flow path.

Conventional gas turbine engines generally include a fan section and a core engine with the fan section having a larger diameter than that of the core engine. The fan section and the core engine are disposed about a longitudinal axis and are enclosed within an engine nacelle assembly.

Combustion gases are discharged from the core engine through a core exhaust nozzle while an annular fan flow, disposed radially outward of the primary airflow path, is discharged through an annular fan exhaust nozzle defined between a fan nacelle and a core nacelle. A majority of thrust is produced by the pressurized fan air discharged through the fan exhaust nozzle, the remaining thrust being provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency therefrom may be negated.

Accordingly, it is desirable to provide an effective, lightweight fan variable area nozzle for a gas turbine engine.

SUMMARY OF THE INVENTION

A turbofan engine according to the present invention includes a fan variable area nozzle that includes a louver system having a multiple of slats generally transverse to the engine axis. Each of the louver slats are pivotally mounted to the fan nacelle to vary the effective area of the fan nozzle exit area and permit efficient operation at various pressure ratios. The louver system is closed to define a converged position for the fan nozzle exit area during a cruise condition and is opened for other flight conditions such as landing and takeoff.

In operation, a controller communicates with an actuator system to adjust the louver slats and vary the area defined by the fan nozzle exit area. By adjusting the entire periphery of the FVAN symmetrically in which the slats are moved uniformly, thrust efficiency and fuel economy are maximized during each flight condition. By separately adjusting the slats within circumferential sectors relative to other sectors of the FVAN to provide an asymmetrical fan nozzle exit area, engine fan bypass flow is selectively vectored.

The present invention therefore provides an effective, lightweight fan variable area nozzle for a gas turbine engine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
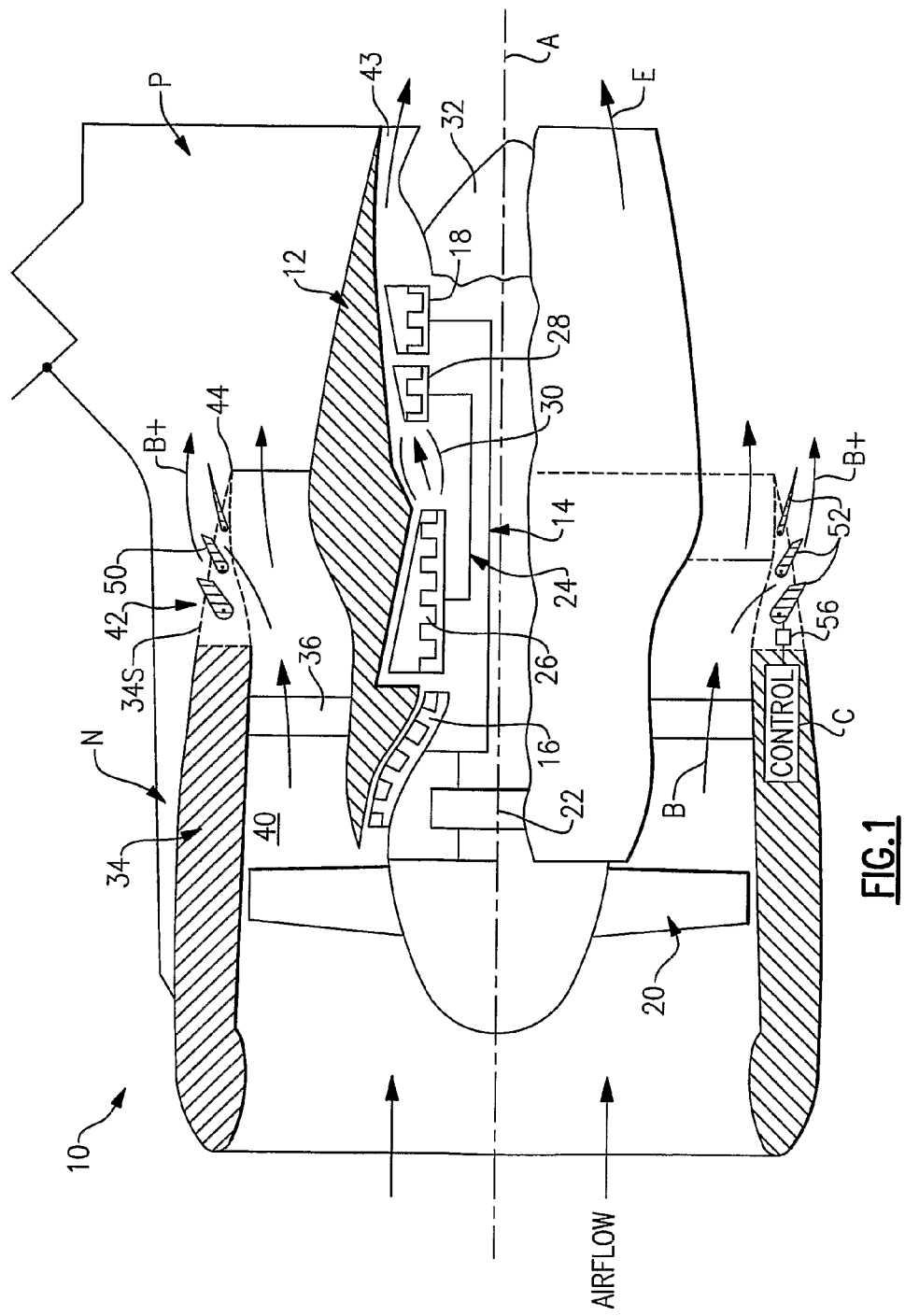
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. Preferably, the engine 10 bypass ratio is greater than (10:1), the turbofan diameter is significantly larger than that of the low pressure compressor 16, and the low pressure turbine 18 has a pressure ratio that is greater than 5:1. The gear train 22 is preferably an epicycle gear train such as a planetary gear system or other gear system with a gear reduction ratio of greater than 2.5:1. It should be understood, however, that the above parameters are only exemplary of a preferred geared turbofan engine and that the present invention is likewise applicable to other gas turbine engines including direct drive turbofans.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by structure 36 often generically referred to as an upper and lower bifurcation. A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40 and is discharged from the engine 10 through a fan variable area nozzle (FVAN) 42 which defines a nozzle exit area 44 between the fan nacelle 34 and the core nacelle 12 at a segment 34S of the fan nacelle 34 downstream of the fan section 20.

Thrust is a function of density, velocity, and area. One or more of these parameters can be manipulated to vary the amount and direction of thrust provided by the bypass flow B. The FVAN 42 includes a louver system 50 to effectively vary the area of the fan nozzle exit area 44 to selectively adjust the pressure ratio of the bypass flow B in response to a controller C.

A significant amount of thrust is provided by the bypass flow B due to the high bypass ratio. The fan section 20 of the engine 10 is preferably designed for a particular flight condition—typically cruise at 0.8M and 35,000 feet. As the fan section 20 are efficiently designed at a particular fixed stagger angle for an efficient cruise condition, the FVAN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff thus providing optimized engine operation over a range of flight conditions with respect to performance and other operational parameters such as noise levels. The FVAN 42 preferably provides an approximately 20% (twenty percent) change in area of the fan exit nozzle area 44.

Figure 2:
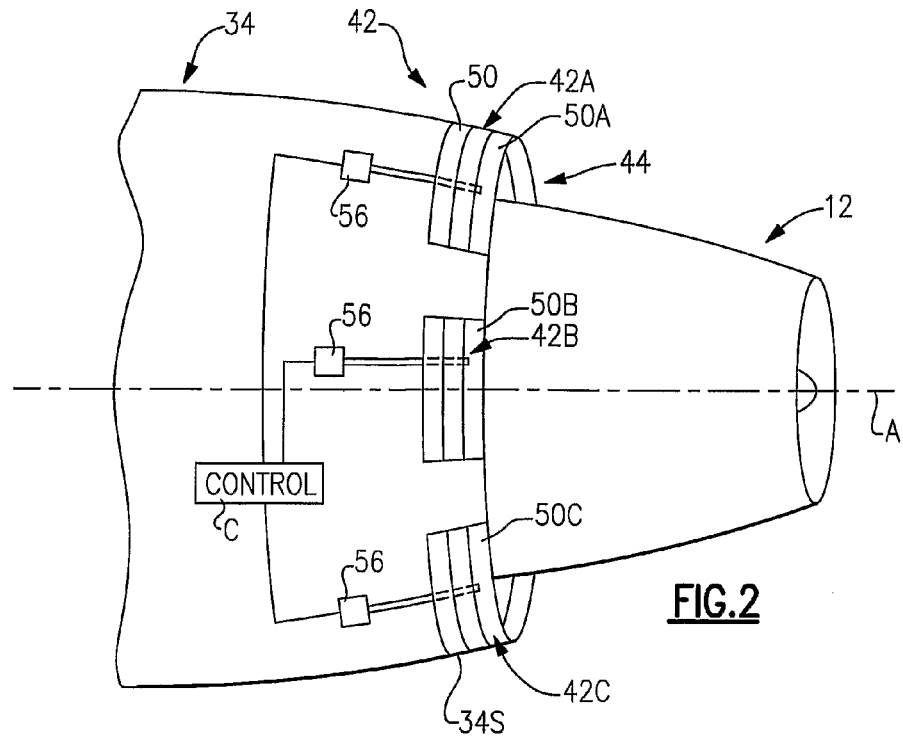
FIG. 2 is a perspective view of the engine.

The FVAN 42 is preferably separated into four sectors 42A-42D (three sectors shown in FIG. 2) which are each independently adjustable to asymmetrically vary the fan nozzle exit area 44 to generate vectored thrust. It should be understood that although four segments are illustrated, any number of segments may alternatively or additionally be provided.

The louver system 50 includes a multiple of slats 52 generally transverse to the engine axis A. The louvers system 50 is defined about a circumference of a fan end segment 34S of the fan nacelle 34. The fan end segment 34S is preferably the aft most end of the fan nacelle 34 to define a trailing edge 34T thereof, however, the louver system 50 may be located anywhere downstream of the fan section 20. Preferably, the louver system 50 includes separate louver system sectors 50A-50D (three shown in FIG. 2) to provide an asymmetrical fan nozzle exit area 44 such that engine fan bypass flow is selectively vectored to provide, for example only, trim balance, thrust controlled maneuvering, enhanced ground operations and short field performance.

Figure 3A:
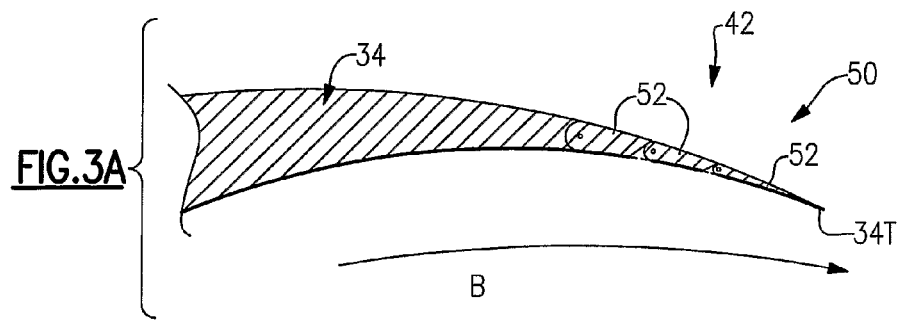
FIG. 3A is a sectional view through a section of the FVAN in a closed position.
Figure 3B:
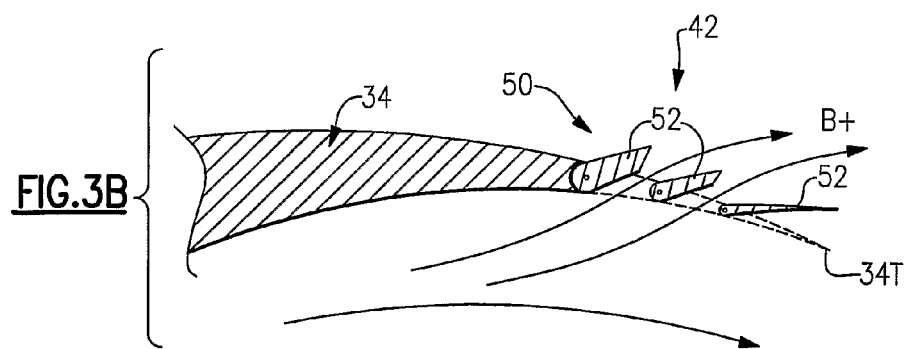
FIG. 3B is a sectional view through a section of the FVAN in an open position.

Each of the louver slats 52 are pivotally mounted to the fan nacelle 34 generally transverse to the engine axis A to change the effective area of the fan nozzle exit area 44 and permit efficient operation at predefined pressure ratios. That is, the bypass flow B is effectively altered by opening and closing the additional flow area of the louver system 50 to increase the bypass flow B+. The louver system 50 changes the physical area and geometry of the fan nacelle in response to the pressure ratio of the bypass flow B during particular flight conditions. Preferably, the louver system 50 is closed (FIG. 3A) to define a converged position for the fan nozzle exit area 44 during a cruise condition and is opened (FIG. 3B) for other flight conditions such as landing and takeoff. It should be understood that other arrangements as well as essentially infinite intermediate positions are likewise usable with the present invention. When the louver system 50 is in the closed position, the louver slats 52 are essentially aerodynamically flush with an outer profile of the fan nacelle 34 for reduced aerodynamic drag.

The louvered system 50 is operated by an actuator system 56 within the fan nacelle 34 (illustrated schematically). The actuator system 56 preferably drives a linkage which operates the louver slats 52 in a simultaneous manner. It should be understood that various linkages and actuator systems will be usable with the present invention.

In operation, the controller C communicates with the actuator system 56 to adjust the louver slats 52 and vary the effective area defined by the fan nozzle exit area 44. Other control systems including an engine controller or an aircraft flight control system may likewise be usable with the present invention. By adjusting the entire periphery of the FVAN 42 symmetrically in which all sectors are moved uniformly, thrust efficiency and fuel economy are maximized during each flight condition. By separately adjusting the circumferential sectors 50A-50D to provide an asymmetrical fan nozzle exit area 44, engine bypass flow is selectively vectored to provide, for example only, trim balance or thrust controlled maneuvering enhanced ground operations or short field performance.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A nacelle assembly for a high-bypass gas turbine engine comprising:
a generally cylindrical core nacelle defined about an axis;
a generally cylindrical fan nacelle mounted at least partially around said core nacelle to define a fan bypass flow path; and
a louver system in communication with said fan bypass flow path and including an end segment of said fan nacelle, said louver system movable between a closed position and an open position to vary a fan nozzle exit area to adjust fan bypass air flow such that the angle of attack of turbofan fan blades are maintained close to design incidence for efficient engine operation, said louver system including a multiple of sectors, each of said multiple of sectors including a multiple of louver slats with a first louver slat arranged forward of a second louver slat.

2. The assembly as recited in claim 1, wherein said louver system includes a multiple of slats generally transverse to said axis.

3. A high-bypass gas turbine engine comprising:
a core engine defined about an axis, said core engine having a low pressure turbine with a pressure ratio that is greater than 5:1;
a gear system driven by said core engine;
a turbofan driven by said gear system about said axis said turbofan having a bypass ratio greater than (10:1);
a core nacelle defined at least partially about said core engine;
a fan nacelle mounted at least partially around said core nacelle to define a fan bypass flow path; and
a louver system subdivided into multiple sectors, in communication with said fan bypass flow path and including an end segment of said fan nacelle, said louver system movable between a closed position and an open position to vary a fan nozzle exit area to adjust fan bypass air flow such that the angle of attack of turbofan fan blades are maintained close to design incidence for efficient engine operation.

4. The engine as recited in claim 3, further comprising a controller in communication with said louver system in response to a flight condition.

5. The engine as recited in claim 3, wherein each of said sectors is separately operable to asymmetrically vary said fan nozzle exit area.

6. The engine as recited in claim 5, further comprising a controller in communication with an actuator system to independently position each of said sectors in response to a flight condition.

7. The engine as recited in claim 3, wherein said louver system defines a generally flush aerodynamic surface with said fan nacelle when in said closed position.

8. A method of varying a fan nozzle exit area of a high-bypass gas turbine engine comprising the steps of:
   (A) positioning a louver system at an end segment of a fan nacelle and in communication with a fan bypass flow path said louver system including a multiple of sectors, each of said multiple of sectors including a multiple of louver slats with a first louver slat arranged forward of a second louver slat;
   (B) selectively varying a fan nozzle exit area in response to a flight condition;
   (C) adjusting fan bypass air flow such that the angle of attack of turbofan fan blades are maintained close to design incidence for efficient engine operation; and
   (D) moving said louver system between a closed position and an open position to vary the fan nozzle exit area.

9. A method as recited in claim 8, wherein said step (A) further comprises;
   (a) pitching a multiple of slats of the louver system from a closed position aerodynamically flush with a fan nacelle.

10. A method as recited in claim 8, wherein said step (A) further comprises:
   (a) positioning the multiple of slats of the louver system in the closed position in response to a cruise flight condition.

11. A method as recited in claim 8, wherein said step (A) further comprises:
   (a) pitching a multiple of slats of the louver system to an intermediate position in response to a non-cruise flight condition.

12. The assembly as recited in claim 1, wherein said high-bypass gas turbine engine has a bypass ratio is greater than (10:1) and a pressure ratio that is greater than 5:1.

13. The assembly as recited in claim 1, wherein said multiple of louver slats additionally has a third louver slat that is arranged aft of said first louver slat and said second louver slat.

14. The assembly as recited in claim 1, wherein each of said multiple of louver slats has a forward end and is pivotably mounted at said forward end.

15. The assembly as recited in claim 1, wherein said first louver slat and said second louver slat each have an inner surface at said fan bypass flow path and an opposed, outer surface, and in said open position said first louver slat and said second louver slat are arranged to receive the fan bypass air flow over said inner surface and said outer surface.

16. The engine as recited in claim 3, further comprising a controller in communication with said louver system and configured to move the louver system between the closed position and the open position in response to a flight condition.

17. The engine as recited in claim 3, wherein said louver system includes a multiple of sectors that are circumferentially arranged around the fan bypass flow path, and each of said multiple of sectors includes a first louver slat arranged forward of a second louver slat.

18. A nacelle assembly for a high-bypass gas turbine engine comprising:
   a generally cylindrical core nacelle defined about an axis;
   a generally cylindrical fan nacelle mounted at least partially around said core nacelle to define a fan bypass flow path; and
   a louver system in communication with said fan bypass flow path and including an end segment of said fan nacelle, said louver system movable between a closed position and an open position to vary a fan nozzle exit area to adjust fan bypass air flow such that the angle of attack of turbofan fan blades are maintained close to design incidence for efficient engine operation, said louver system including multiple pivotable louver slats having an inner surface at said fan bypass flow path and an opposed, outer surface, and in said open position said pivotable louver slats are positioned to receive the fan bypass air flow over said inner surface and said outer surface.

* * * * *